United States Patent [19]

Dokuzoguz

[11] 3,980,757
[45] Sept. 14, 1976

[54] PROCESS FOR URANIUM SEPARATION AND PREPARATION OF $UO_4 \cdot 2NH_3 \cdot 2HF$

[75] Inventor: Halit Z. Dokuzoguz, Lynchburg, Va.

[73] Assignee: The Babcock & Wilcox Company, New York, N.Y.

[22] Filed: Sept. 14, 1973

[21] Appl. No.: 397,459

Related U.S. Application Data

[63] Continuation-in-part of Ser. No. 304,425, Nov. 6, 1972, abandoned.

[52] U.S. Cl. .............................. 423/253; 423/11; 423/15; 423/16
[51] Int. Cl.² ................................ C01G 43/00
[58] Field of Search ............ 423/11, 15, 16, 253, 423/260

[56] References Cited
UNITED STATES PATENTS

| | | | |
|---|---|---|---|
| 2,659,655 | 11/1953 | Sweet | 423/260 |
| 2,764,470 | 9/1956 | Richardson et al. | 423/260 X |
| 2,780,515 | 2/1957 | Miller et al. | 423/16 |
| 2,790,702 | 4/1957 | McCullough | 423/10 |
| 2,847,277 | 8/1958 | King et al. | 423/16 |
| 2,900,227 | 8/1959 | Dancy et al. | 423/15 |
| 3,174,821 | 3/1965 | Opratko et al. | 423/15 |
| 3,238,014 | 3/1966 | Gens | 423/16 |
| 3,842,155 | 10/1974 | Muller et al. | 423/253 X |

*Primary Examiner*—Benjamin R. Padgett
*Assistant Examiner*—Edward A. Miller
*Attorney, Agent, or Firm*—J. M. Maguire; J. P. Sinnott; A. P. Cefalo

[57] ABSTRACT

A process for treating the aqueous effluents that are produced in converting gaseous $UF_6$ (uranium hexafluoride) into solid $UO_2$ (uranium dioxide) by way of an intermediate $(NH_4)_4 UO_2 (CO_3)_3$ ("AUC" Compound) is disclosed. These effluents, which contain large amounts of $NH_4^+$ (ammonium), $CO_3^{--}$ (carbonate), $F^-$ (fluoride), and a small amount of U (uranium), are mixed with $H_2SO_4$ (sulfuric acid) in order to expel $CO_2$ (carbon dioxide) and thereby reduce the carbonate concentration. The uranium is precipitated through treatment with $H_2O_2$ (hydrogen peroxide) and the fluoride is easily recovered in the form of $CaF_2$ (calcium fluoride) by contacting the process liquid with CaO (calcium oxide). The presence of $SO_4^{--}$ (sulfate) in the process liquid during CaO contacting seems to prevent the development of a difficult-to-filter colloid. The process also provides for $NH_3$ (ammonia) recovery and recycling. Liquids discharged from the process, moreover, are essentially free of environmental pollutants. The waste treatment products, i.e. $CO_2$, $NH_3$, and U are economically recovered and recycled back into the $UF_6 \rightarrow UO_2$ conversion process. The process, moreover, recovers the uranium as a precipitate in the second stage. This precipitate is a new inorganic chemical compound $UO_4 \cdot 2NH_3 \cdot 2HF$ [uranyl peroxide-2-ammonia-2-(hydrogen fluoride)].

9 Claims, 4 Drawing Figures

PROCESS FOR URANIUM SEPARATION AND PREPARATION OF $UO_4.2NH_3.2HF$

This is a continuation-in-part of United States patent application Ser. No. 304,425, filed on Nov. 6, 1972, and now abandoned.

BACKGROUND OF THE INVENTION

1. Field of the Invention

This invention relates to chemical processes, and more particularly, to an efficient and inexpensive method for recovering uranium from process effluents, and the like.

2. Description of the Prior Art

In order to produce fuel for nuclear reactors, it is often necessary to convert uranium hexafluoride into uranium dioxide. A number of techniques have been developed for this purpose. It has been suggested, for example, to mix an aqueous solution of uranium hexafluoride with ammonia and carbon dioxide in the AUC process. In addition to a uranium precipitate, this process also produces a filtrate and an absorption washer waste that contain $NH_4F$ (ammonium fluoride), ammonia and carbon dioxide as well as trace amounts of uranium. The carbon dioxide is removed from the filtrate through an expeller and thermosiphon evaporator loop, an expensive and complicated item of process equipment.

In subsequent stages, moreover, colloidal suspensions, or gels, are formed that liquify when stirred and solidify on standing. This characteristic, known as thixotropy, renders the fluoride precipitation and recovery stage inefficient, time-consuming and expensive.

There are further considerations that transcend the conventional chemical process economics. For instance, not only must the process wastes be environmentally acceptable but the uranium accumulated within the process stages also must at no time reach a "critical" mass sufficient to initiate an accidental nuclear fission reaction. In this latter regard, it has been noted that higher than usual concentrations of uranium in the filtrate that provides the feed for this process tends to cause an $(NH_4)_3 UF_8$ precipitate in the first stage expeller.

It is possible that this precipitate might settle into a critical assembly that would produce a dangerous nuclear reaction.

Accordingly, there is a need for a safe, less expensive and more efficient uranium dioxide conversion waste treatment process than that which heretofore has been available.

SUMMARY

In accordance with the invention, these foregoing problems associated with the treatment of the aqueous effluents that are produced in converting uranium hexafluoride into uranium dioxide are, to a large extent, overcome. A typical example of the invention commences with an effluent, filtrate or process liquid and absorption washer waste from the AUC process in which the filtrate has a titratable basicity of 2.0 to 2.5 equivalents per liter (eq/1) and an hydronium concentration that corresponds to a pH of about 9.0 to 9.5. In passing it should be noted that the pH system is a quantitative measure of solution alkalinity. Neutral solutions, for example, have a pH of 7; acidic solutions have pH values that are less than 7; and pH of alkaline solutions is greater than 7.

A typical liquid effluent providing a suitable feed or process liquid for the practice of the present invention might contain large amounts of ammonium, carbonate and fluoride as well as a relatively small amount or uranium. This liquid is poured into an acidification vessel in which it is mixed with enough $H_2SO_4$ (sulfuric acid) to reduce the pH to 7 or less. The reactant liquid is stirred and cooled to release $CO_2$ gas, thereby reducing the carbonate concentration to an acceptable level. This reduction in carbonate concentration promotes a more complete uranium separation in the second stage of the process because, it has been found, "high" carbonate concentrations seem to hinder uranium precipitation.

The process liquid then is tranferred to a uranium precipitation tank, and an aqueous ammonia solution or gaseous ammonia is added to the liquid in order to increase the pH to a range of 8.5 to 9. After establishing a suitably basic solution, $H_2O_2$ (hydrogen peroxide) is added to the uranium precipitation tank for the purpose of uranium separation. In accordance with a feature of the invention, the sulfates carried over from the sulfuric acid treatment remain in solution in the uranium precipitation tank.

The uranium is almost completely separated in this stage, the separation factor being greater than 0.99. It has been found, moreover, that the uranium precipitates as a new inorganic chemical compound, $UO_4.2NH_3.2HF$ [uranyl peroxide -2-ammonia-2-(hydrogen fluoride)].

After the uranium precipitation is complete, the sulfate-bearing process liquid filtrate is transferred to a fluoride precipitator and filter tank in order to recover this element. To separate the fluorides, calcium oxide is added to the filtrate and the pH of the resulting liquid increases to about 12. The precipitate settling out of this third stage contains $CaF_2$ (calcium fluoride), $CaSO_4$(calcium sulfate), and $CaO.xH_2O$ (hydrated calcium oxide). It appears that the sulfate, added in the first stage as a part of the reagent used to drive off the carbon dioxide, provides the unusual and unexpected benefit in the third stage of promoting better filtration by preventing the formation of the thixotropic colloid that has balked prior fluoride filtration techniques.

In this third stage, water vapor and ammonia also are evaporated and passed through a condenser to produce aqueous ammonia, a portion of which may be recycled back into the second stage for pH adjustment. The balance of the aqueous ammonia can, moreover, be made available for other uses. For example, this extra aqueous ammonia can be "rectified" or separated into water and dry ammonia gas. The dry ammonia gas then can be applied to the AUC process from whence the effluents under consideration were derived. Some of the dry ammonia gas also can be applied to pH adjustment in the second stage, if this stage is designed to accept gaseous ammonia.

The liquid that is discharged from this process can be disposed of through ordinary sewage facitities because the industrial and environmental contaminants in this waste are within the present or anticipated acceptable maxima for these materials.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENTS

Figure 1:
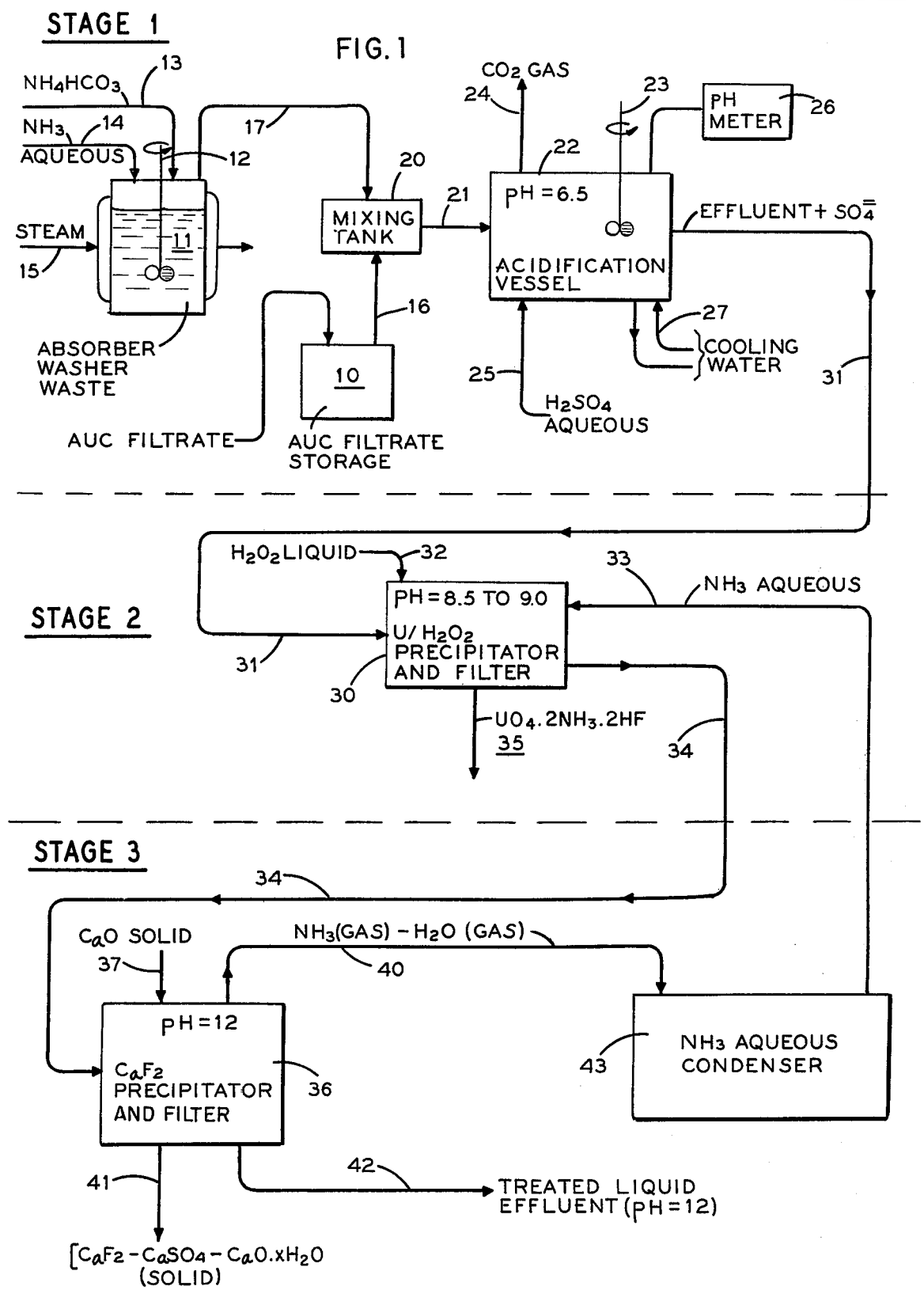
FIG. 1 is a schematic process flow diagram illustrating the principles of the invention.

For a more complete appreciation of the invention, attention is invited to the following description of an illustrative embodiment of the invention. To store and prepare raw materials for the process, two tanks, a filtrate storage tank 10 and fluid bed absorption washer waste tank 11 are provided. The washer waste tank, moreover, is equipped with a stirrer 12 and inlet piping 13 and 14 in order to add $NH_4HCO_3$, and aqueous $NH_3$, respectively, to the waste. To inlets 13 and 14 and the reagents added to the washer waste through these inlets are for process study purposes. The temperature of the mixer, moreover, is maintained through a steam jacket 15, also provided for study purposes.

Typical average chemical compositions along with other chemical and physical data for these effluents are tabulated as follows:

|  | AUC Filtrate | F. B. Absorp. Washer Waste | 1:1 Mixture |
| --- | --- | --- | --- |
| $NH_4^+$ | 146 g/l | *60 g/l | 103 g/l |
| Tot. carbonate species as $CO_3^=$ | 74 g/l | *153 g/l | 114 g/l |
| $F^-$ | 100 g/l | nonappreciable | 50 g/l |
| U (tot.) | 267 mg/l | **70 mg/l | 168 mg/l |
| Fe (tot.) | **66 mg/l |  |  |
| Cr (tot.) | **1 mg/l |  |  |
| Ni (tot.) | **0.9 mg/l |  |  |
| pH | 9.0–9.5 | 8.8–9.0 | 9.0 |
| Titrable base | 2.0–2.5N | 2.0–2.5N | 2.0–2.5N |
| Density (at 18°C) | 1.10 g/cc | 1.06 g/cc |  |
| Specific heat | 0.92 Cal/g-°C | 0.94 Cal/g-°C |  |

*Calculated from mass balance
**Observed

The AUC filtrate and the washer waste are drawn from the tanks 10 and 11 through conduits 16 and 17, respectively. The two fluids are combined in equal proportion, in one or more mixing tanks 20 to form a mixture, or liquid that is passed through a conduit 21 to an acidification vessel 22. Naturally, the process can be applied to either the AUC filtrate or to the washer waste alone.

Illustratively, the vessel 22 is equipped with a stirrer 23, a $CO_2$ gas discharge 24, an $H_2SO_4$ inlet 25, a pH meter 26 and an immersed cooling water coil 27.

$H_2SO_4$ is added to the stirred and cooled mixture in the vessel through an L-shaped tube (not shown) until the pH is less than 7 and preferably, about 6.5. Other strong acids, hydrochloric, nitric, and hydrofluoric acids, for example, are suitable for carbonate separation. Weaker acids, e.g. acetic acid, are likely to be relatively inefficient and uneconomical for this purpose.

The L shaped tube is used for acid addition because it enables the $CO_2$ that is released through the contact between sulfuric acid and the AUC - waste mixture to flow through the liquid before being discharged into the atmosphere. This feature of the invention minimizes the liberation of other volatile materials that usually occurs because of the local heat that is generated through the liquid-acid contact.

Preferably, the cooling coil 27 maintains the solution temperature below 40°C in the first stage of the process. In an illustrative embodiment of the invention, about 200 liters (l) of only AUC filtrate having a composition of the sort decribed in the above table, are transferred from the AUC filtrate storage tank 10 to acidification vessel 22. Depending on the $CO_3^{--}$ concentration, 10 to 20 l of the concentrated $H_2SO_4$ is added to the vessel 22 in order to lower the pH to 6.5. Although the 6.5 pH is a preferred value, any acidic pH less than 7 should be acceptable, the acid being added until the desired amount of carbonate is driven off. The liquid in the vessel 22 is vigorously stirred during acid addition and is cooled to less than 40°C, if necessary, in order to eliminate the inclusion of other volatile materials in the $CO_2$ gas that is being released through the discharge 24.

When the final $CO_3^{--}$ concentration in the resulting liquid is reduced to less than 5 g/l, the filtrate is transferred into a uranium precipitator and filter 30 through a conduit 31. The uranium precipitator 30 is equipped with $H_2O_2$ and gaseous $NH_3$ inlets 32 and 33, respectively, Aqueous ammonia, however, could be used in this instance if desired.

In operation, and in accordance with a further feature of the invention, the liquid mixture or residual mixture has a concentration of $SO_4^{--}$ (sulfate) ions in solution as a consequence of $H_2SO_4$ addition in the preceding acidification stage. As described subsequently in more complete detail, the sulfate ion appears to inhibit thixotropy and promote filtration in the third stage. Thus, the addition of $H_2SO_4$ in the first state not only eliminates the need for a great deal of elaborate thermosiphon evaporator and related apparatus in that stage, but also provides a more subtle and unexpected benefit in the last stage of the process.

The residual mixture that is transferred to the precipitator and filter tank 30 is heated to 45° to 50°C. On reaching this temperature range, the heating is discontinued. The residual mixture than is made basic by adding $NH_3$ through the inlet 33 in either an aqueous solution or as a gas. Although $NH_3$ is described for the purpose of illustration, any base should serve the purpose of the invention as long as the cation from the base is acceptable in the process waste and produces the uranium precipitate that is hereinafter described in more complete detail. Ammonia, moreover, is particularly suitable for the purpose of the invention because ammonium ions are in the feed mixture at the start of the process.

The pH of the residual mixture should be adjusted to a range of 8.5 to 9. In this connection, a pH of 9 has been found most suitable for the process. After the foregoing heating and pH adjustment, the $H_2O_2$ is added to the solution by way of the inlet 32. About 2 ml of 60 percent $H_2O_2$ is required for each liter of the residual mixture in the tank 30 in order to provide an adequate excess for optimum uranium precipitation.

The uranium precipitator 30, moreover, also has a pair of filters candles with a total filter surface of 350 cm² and a porosity of 0.4 $\mu$ with a 98 percent nominal hold-back to provide extraction means 34 to separate the uranium precipitate from the residual mixture. To promote mixing and settling, the precipitator and filter tank 30 also has a stirrer and an internal steam coil, none of which is shown in the figure of the drawing. Extracting the filtrate from the precipitator and filter tank 30 is promoted by maintaining a vacuum on the filter candles 34 through a vacuum pump (not shown in the figure drawing). The reaction mixture is stirred and a precipitate forms slowly. Typically, the stirring is continued for approximately one hour followed by one hour for settling. At the end of the second hour, the precipitation is almost complete and has been shown to have a value in excess of 99 percent uranium precipitation.

As shown in the drawings, the uranium precipitate is removed from the precipitator and filter tank 30 through a separation means 35 after about seven or eight batches have been processed in the precipitator and filter 30. Preferably, the separation means 35 comprises a plain suction filter assembly having a PALL Grade H stainless steel sintered filter plate. It has been found that some of the uranium precipitate should remain in the precipitator and filter after most of this material has been removed by way of the separation means in order to provide seeding for the next precipitation. This seeding improves the settling and filterability of subsequent residual mixture batches. It is believed that this occurs because the uranium in the supernatant (the liquid above settled precipitate) is reduced significantly through filtering in the precipitate layer that formed on the filter candles 34. It has been further theorized that this phenomenon occurs because very fine particles suspended in the supernatant are retained in the precipitate layer, and, or perhaps alternatively, the uranium which has not been precipitated also is sorbed in this layer.

The filtrate that is drawn through the filter candles 34 flows into a $F^-$ or $CaF_2$-$CaSO_4$-$CaO.xH_2O$ precipitation and filter tank 36 as shown in the drawing. The tank 36 has an inlet 37 through which solid CaO is added to the reaction liquid. A vapor discharge 40 also is provided through which $NH_3$ vapor and water vapor are withdrawn from the tank 36. Process efficiency, moreover, is increased through $NH_3$ recovery and recycling. A precipitate discharge 41 also is associated with the tank in order to enable the $F^-$, $SO_4^{--}$, and hydrate compounds to be withdrawn. Barium oxide, magnesium oxide and calcium hydroxide also might be suitable for the purpose of precipitating the $F^-$ and $SO_4^{--}$ and liberating the $NH_3$, although these reagents would be less attractive than the illustrative CaO.

A further filtrate discharge 42 is provided in order to withdraw the depleted process liquid, which, in accordance with a feature of the invention, has concentrations of chemical matter that are so low that they could be discharged into conventional waste disposal systems.

In operation, a vacuum of about 40–100 mm of water (gauge) is maintained in the tank 36 in order to accelerate $NH_3$ and water vapor discharge. Conventional chemical process equipment also associated with the $CaF_2$ precipitator and filter tank 36 includes an air inlet or sparge, a stirrer, a steam jacket, and an internal water cooling coil (not shown in the drawing).

Preferably, the filtrate in the $CaF_2$ precipitator and filter tank 36 is heated to 80° to 85°C. On reaching this temperature range, heating is discontinued and solid CaO is added to the liquid. The reaction between the liquid and CaO is exothermic, i.e., the reaction generates heat.

Consequently, the CaO is added to the liquid very slowly through the use, for example, of a feed screw. The CaO is added until, in the preferred embodiment, a 20 percent excess of CaO over the calculated amount that is necessary to precipitate all of the $F^-$ and $SO_4^{--}$ is reached. Thus, for example, for a 200 l filtrate batch, approximately 50 kg of CaO is added over a period of 1½ hours.

The resulting reaction mixture is stirred continuously as the gaseous $NH_3$ and water vapor are liberated. These gases, are passed through a stainless steel plate and frame type heat exchanger or condenser 43 in order to condense the gaseous $NH_3$ and water vapor and produce an aqueous $NH_3$.

As shown in the drawing, the condenser 43 is provided for the purpose of $NH_3$ recovery. A portion of the aqueous $NH_3$ is withdrawn from the condenser 43 by way of the $NH_3$ inlet 33 and is recycled into the uranium precipitator 30 for pH adjustment in that second stage, as hereinbefore described.

As previously mentioned, an important although subtle advantage of the invention is the relatively trouble free and efficient filtration of solid matter from the reaction liquid in the $CaF_2$ precipitator tank 36 because of the $SO_4^{--}$ carried through to this third and last stage of the process seems to inhibit gel development within the tank. Thus, it appears that gel formation which tends to frustrate precipitation of solid matter in prior filtrates does not develop because of the presence of the sulfate ion that was carried over from the initial addition of $H_2SO_4$ to the first stage of the process.

The pH of the liquid in the tank 36 is not particularly important but generally reaches a value of about 12. After the CaO addition is complete, the filtrate is boiled to expel more gaseous $NH_3$ and leave a residual slurry in the $CaF_2$ precipitation tank 36. This slurry is not thixothropic and contains, in solid form, a mixture of $CaF_2$, $CaSO_4$, and $CaO.xH_2O$. The filtering of this solid matter from slurry is relatively easy and, in the illustrative embodiment of the invention, produces 100 kg of precipitate cake in each hour.

Preferably, the $CaF_2$ precipitator and filter tank 36 comprises a Dorr-Oliver vacuum drum filter that is equipped with roller discharging and is connected to a vacuum pump and tank assembly.

Process waste liquid that is discharged through the conduit 42 contains an insignificant concentration of industrial waste products and contaminants. For example, the $NH_4^+$ is in an amount of less than 100 mg/l; the $CO_3^{--}$ occurs in an amount that corresponds to normally dissolved $CO_2$; $F^-$ concentration is less than 10 mg/l; and U is less than 1 mg/l.

Figure 2:
FIG. 2 illustrates (at 10,000 magnifications with a scanning electron microscope) the clearly defined and highly ordered crystalline structure that characterizes the new uranium compound produced in the process that is shown in FIG. 1.
Figure 3:
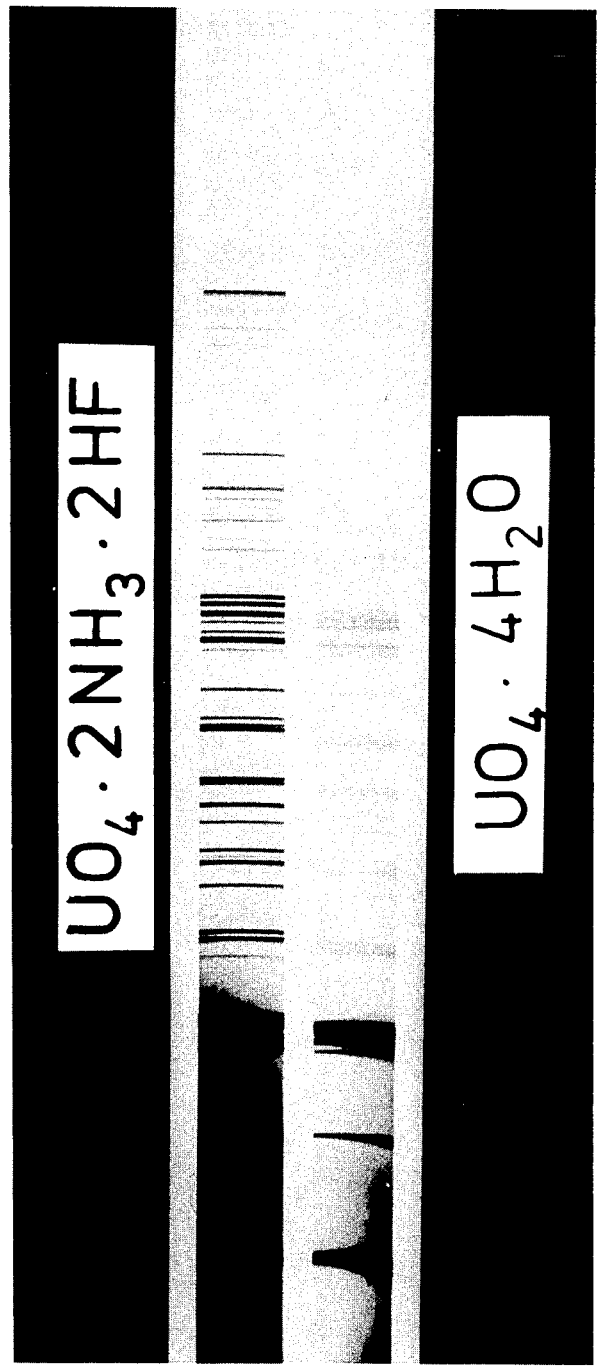
FIG. 3 is the X-ray powder diffraction pattern of the new uranium compound shown in FIG. 2 in comparison with the X-ray powder diffraction pattern of a hitherto known uranium compound.

Turning once more to FIG. 1 it has been found that the uranium precipitate that forms on the separation means 35 is a bright yellow precipitate that has a novel chemical composition identified as UO$_4$.2NH$_3$.2HF [uranyl peroxide-2-ammonia-2-(hydrogen fluoride)]. FIG. 2 of the drawing illustrates (at a magnification of 10,000 with a scanning electron microscope) the clearly defined highly ordered crystalline structure that characterizes this compound. This substance has an X-ray powder diffraction pattern exhibiting some similarities to that which has been reported for UO$_4$.4H$_2$O. A comparison between the two diffraction patterns that are unique to and identify the compounds under consideration is shown in FIG. 3. Two salient differences between these patterns are apparent from a study of this figure. As viewed in FIG. 3 the UO$_4$.2NH$_3$.2 HF line pattern appears to have been shifted slightly to the right of the UO$_4$.4H$_2$O pattern. The intensity of the UO$_4$.2NH$_3$.2HF lines is much greater than the UO$_4$.4H$_2$O lines. This greater intensity demonstrates the better crystallinity and relatively larger crystallite size of the UO$_4$.2NH$_3$.2HF compound.

Chemical analyses, moreover, further support this proof of a new inorganic compound because these analyses indicate that the precipitate in the filter 30 contains almost no water but contains, instead, apparently equimolecular amounts of ammonium and fluoride.

EXAMPLE

Preparation

The sample used for identification was drawn from 200 l of an AUC waste solution containing 0.0021 M (molar) uranyl ion, 9.32 M ammonium, 9.10 M fluoride, 0.02 M total carbonate, and having a pH of 9.0. The total amount of other impurities was less than 50 mg/l.

The precipitation was carried out at 50°C by adding 600 ml of 40 percent hydrogen peroxide solution, corresponding to an approximately 20 fold excess relative to uranyl ion. The deeply orange-red mixture was stirred vigorously till the first turbidity appeared and then allowed to stand for a few hours. The bulk of the filtrate, which contained 0.5 mg/l uranium, was decanted; the remaining suspension being filtered, preferably over a steel filter plate, in the separation means 35. (FIG. 1) The precipitate was washed with distilled water until free of ammonium and fluoride and vacuum dried at room temperature.

Chemical Analyses — For uranium, ammonia, fluoride, peroxidic oxygen, iron, water and total carbonate The amount of uranium in the sample was determined through a volumetric method. A sample of the dried solid precipitate was dissolved in dilute sulfuric acid and was freed of cationic impurities by extraction of the latter with cupferron/chloroform. This extraction technique is described in TID-7029 (National Technical Information Service, U.S. Department of Commerce, Springfield, Va. 22151.) The uranium was reduced to the tetravalent state in a Jones reductor and subsequently oxidized with ferric iron. The ferrous iron so formed was titrated with 0.025 N potassium dichromate with sodium diphenylaminesulfate as an indicator.

Fluoride was determined in an acidic solution of the precipitate sample in the following fashion. The solution was buffered with chloroacetic acid and sodium hydroxide at pH 2.6 and directly titrated with 0.1 N thorium nitrate solution. Alizarin S was used as an indicator.

Ammonia in the precipitate sample was determined through the conventional Kjeldahl method. This method is described, for example, on pages 311 through 313 of ANALYTICAL CHEMISTRY—AN INTRODUCTION by D. A. Skoog et al., Holt, Rinchart and Winston, N.Y., 1965.

Peroxidic oxygen was determined in the precipitate by means of titration with 0.1 N potassium permanganate solution, in the manner that is more completely described in the paper published by G. W. Watt, S. O. Achorn and J. L. Marley. (J. Am. Chem. Soc. 3341, 1950) Water analysis was done with the familiar Karl Fisher method.

All of these substances — uranium, fluoride, ammonia and peroxidic oxygen were identified in the precipitate that was collected from the separation means 35 (FIG. 1) through the foregoing analytic techniques.

The results of the foregoing analyses are as follows:

Table 1

Chemical Analysis and Molar Ratios for UO$_4$.2NH$_3$.2HF

| | % Calc. for UO$_4$.2NH$_3$.2HF | % Found | Molar Ratio Found |
|---|---|---|---|
| U | 63.3 | 61.4±0.1 | 1.00 |
| NH$_4$$^+$ | 9.6 | 9.8±0.1 | 2.11±0.04 |
| F | 10.1 | 10.4±0.1 | 2.12±0.04 |
| peroxidic O | 8.5* | 8.8±0.1 | 2.14±0.04 |
| carbonate (as CO$_3$) | — | 0.7±0.1 | — |
| Fe | — | 0.38±0.001 | — |
| H$_2$O | — | 0.2±0.1 | — |

*Two atoms of peroxidic oxygen permolecule of UO$_4$.

The water and the carbonate are obvious impurities and some known formula that would fit the observed molar ratios was sought. No known compound fits the results of the foregoing chemical analyses. The formula UO$_4$.2NH$_3$.2HF, however, is entirely compatable with the above mentioned chemical analyses.

X-ray Powder Diffraction Analysis

Diffraction patterns for the precipitate, as illustrated in FIG. 3, were obtained with a Guinier camera. The X-rays were generated in a tube with a copper target. This target emits an X-ray radiation that has a specific frequency and wave length which is termed "K $\alpha_1$ line." More specifically, this particular radiation is identified as "CuK $\alpha_1$ radiation in which the radiation wave length ($\lambda$) is equal to 1.5405 Angstrom units (A)", where 1 Angstrom equals 10$^{-8}$cm.

Figure 4:
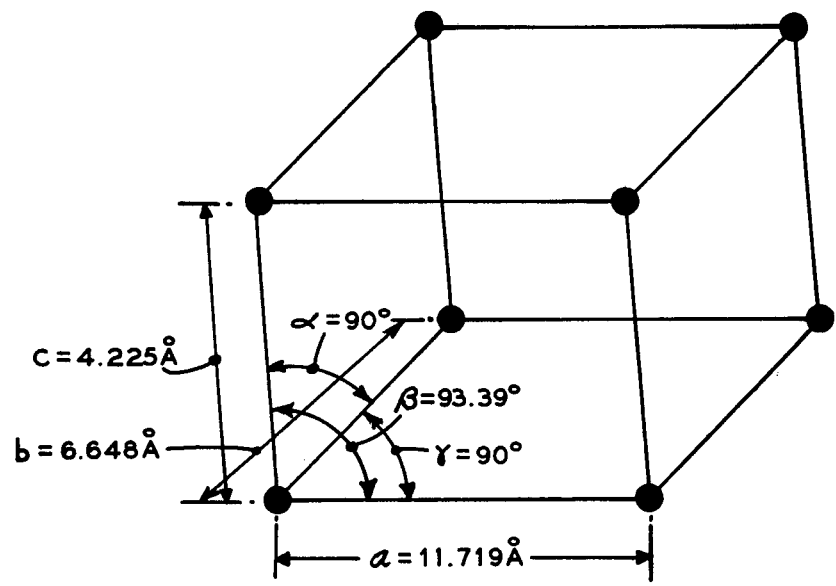
FIG. 4 illustrates the monoclinic crystal structure that characterizes the new compound that is shown in FIG. 2.

With respect to the proof of the unique and novel chemical nature of the precipitate at the separation means 35 (FIG. 1) attention is once more invited to FIG. 3. As a starting point, the X-ray powder diffraction pattern is unambiguously indexed with the known powder diffraction pattern for UO$_4$.4H$_2$O. In order to convert the raw X-ray diffraction pattern data into some indication of the crystal structure for this new compound, a "least squares" mathematical analysis was applied to the X-ray data in a conventional manner. The least squares analysis indicated that the crystal lattice, or the structural arrangement of the atoms that form the individual crystals is "monoclinic". In passing, a monoclinic crystal structure is defined by three sides $a$, $b$ and $c$, wherein; the included angles between sides $a$ and $b$ and sides $b$ and $c$ equal 90°, the included angle between sides $a$ and $c$ does not equal 90°, side $c$ is less than or equal to side $a$ in length and side $b$ is arbitrary in length. The monoclinic arrangement of this new compound is shown in FIG. 4. Expressed in terms of conventional crystal classifications, the angle $\beta$ between the horizontal side $a$ and the vertical side $c$ of the crystal is 93.39° ±0.001°. The angle $\gamma$ that is formed between the two horizontal crystal crystal sides $a$ and $b$ is 90° and the lengths of the sides $a$, $b$ and $c$ are, respectively, 11.719±0.002A, 6.648±0.001A; and 4.225±0.001A. These crystal classification parameters are unique to this chemical compound and are not repeated in any other substance.

The results of the X-ray analysis that provided the raw data from which the crystal structure was developed is given in Table 2.

Table 2

Powder Diffraction Pattern of $UO_4.2NH_3.2HF$ (CuK$\alpha_1$ radiation; $\lambda$= 1.5405 A)

| d (A) (obs.) | hkl | I (est.) | |
|---|---|---|---|
| 5.85 | 200, 110 | 100 | broad |
| 4.23 | 001 | 20 | |
| 3.53 | 201 | 20 | |
| 3.47 | 111 | 20 | |
| 3.37 | 310, 111 | 50 | |
| 3.33 | 201, 020 | 10 | |
| 2.93 | 400 | 5 | |
| 2.89 | 220 | 5 | |
| 2.703 | 311 | 5 | |
| 2.614 | 021 | 5 | |
| 2.571 | 311 | 5 | |
| 2.478 | 401 | 5 | |
| 2.420 | 221 | 10 | |
| 2.355 | 221 | 3 | |
| 2.341 | 401 | 5 | |
| 2.209 | 510 | 5 | |
| 2.197 | 420 | 5 | |
| 2.179 | 130 | 5 | |
| 2.111 | 002 | 5 | |
| 2.020 | 202 | 3 | |
| 2.002 | 511, 112 | 20 | |
| 1.983 | 421 | 3 | |
| 1.963 | 112 | 3 | |
| 1.945 | 202, 131 | 10 | diff |
| 1.926 | 330, 131 | 10 | |
| 1.912 | 421, 511 | 10 | |
| 1.829 | 312 | 3 | |
| 1.812 | 601 | 3 | |
| 1.781 | 022 | 3 | |
| 1.773 | 331 | 1 | |
| 1.760 | 402 | 1 | |
| 1.748 | 312 | 5 | |
| 1.731 | 601 | 5 | diff |
| 1.682 | 620 | 10 | |
| 1.662 | 040 | 5 | diff |
| 1.621 | 710 | 3 | |
| 1.609 | 530 | 3 | |
| 1.598 | 240 | 3 | |
| 1.591 | 621 | 3 | |
| 1.569 | 512 | 1 | |
| 1.556 | 422 | 1 | |
| 1.545 | 041 | 3 | diff |
| 1.535 | 621 | 1 | |
| 1.522 | 132 | 5 | |
| 1.504 | 241 | 3 | diff |
| 1.484 | 711, 512 | 10 | |
| 1.475 | 602 | 1 | |
| 1.461 | 800 | 1 | |
| 1.443 | 440, 332 | 5 | |
| 1.403 | 332 | 1 | diff |
| 1.375 | 113 | 1 | diff |
| 1.356 | 801, 113 | 5 | |

Table 2-continued

Powder Diffraction Pattern of $UO_4.2NH_3.2HF$ (CuK$_1$ radiation; $\lambda$= 1.5405 A)

| d (A) (obs.) | hkl | I (est.) | |
|---|---|---|---|
| 1.347 | 203, 622 | 3 | |
| 1.336 | 730 | 1 | |
| 1.321 | 712, 313, 150 | 5 | |
| 1.305 | 042, 532 | 3 | |
| 1.295 | 023 | 3 | |
| 1.283 | 242, 622 | 1 | |
| 1.275 | 313 | 1 | |
| 1.264 | 640, 242 | 3 | diff |
| 1.257 | 821 | 3 | diff | where the Miller indices $hkl$ are well known notations used to identify the planes in a crystal lattice, see C. Kittel, *Introduction to Solid State Physics*, pg. 13, John Wiley & Sons, 1953, $d$ is the separation between the planes that are characterized by the Miller indices and I is the relative intensity of a diffraction line with respect to the most pronounced line in the diffraction pattern.

In both $UO_4.2NH_3.2HF$ and $UO_4.4H_2O$ the essential structural framework is formed by $UO_4$-units, with $NH_3$, + HF and $H_2O$, respectively, occupying "interstitial" positions between these $UO_4$ units. It further appears from an analysis of the data that the nitrogen and fluorine atoms in the $UO_4.2NH_3.2HF$ compound occupy the same lattice points that are occupied by the water molecule oxygen atoms in the $UO_4.4H_2O$ with which the new compound has been compared.

This new chemical compound $UO_4.2NH_3.2HF$ is a useful feed material for $UO_2$ production. The compound, moreover, is produced without generating environmental pollutants. In practice, the $UO_4.2NH_3.2HF$ precipitate can be cycled back into $UO_2$ production in a number of ways. Typically, three of these processes are described below.

In the first technique, $UO_4.2NH_3.2HF$ is mixed with the AUC powder in the $UO_2$ conversion process. In this method the $UO_4.2HN_3.2HF$ and AUC mixture is first calcined to $UO_3$. Stoichiometric $UO_2$ in which there is exactly two oxygen atoms for each atom of uranium is produced from the calcined $UO_3$, by burning or "reducing" all excess oxygen in the calcined $UO_3$ with hydrogen gas. Fluoride impurities present in the stoichiometric $UO_2$ are removed through pyrohydrolysis, that is, an application of steam to the material to produce easily separable HF. The stoichiometric $UO_2$ powder is spontaneously combustible in air, or "pyrophoric." Accordingly, this $UO_2$ is partially oxidized with a controlled amount of air to eliminate this pyrophoric quality. The result of this second oxidation is a stable nonstoichiometric compound of about $UO_{2.08}$ to $UO_{2.20}$.

In the second technique, the $UO_4.2NH_3.2HF$ is heated at high temperatures (e.g., 750°C) in the presence of steam and air (i.e. calcined and pyrohydrolyzed). This procedure produces $U_3O_8$ powder that has less than 100 ppm fluoride. The resulting $U_3O_8$ can be blended, in varying amounts, with a stable $UO_2$ powder that is obtained from the AUC conversion for future processing.

In the third technique $UO_4.2NH_3.2HF$ is dissolved in nitric acid ($HNO_3$). The resulting uranyl nitrate solution is fed into the AUC precipitation. The precipitate is converted into stable $UO_2$ in the same manner as described in connection with the first technique.

Thus the invention provides not only an efficient secondary recovery process for extracting useful quantities of uranium from process effluents in a way that eliminates environmental pollutants, but it also provides a new and useful chemical compound.

The embodiments of the invention in which an exclusive property or privilege is claimed are defined as follows:

1. A process for producing $UO_4.2NH_3.2HF$ from a uraniferous mixture that is produced in converting uranium hexafluoride into uranium dioxide by way of an intermediate $(NH_4)_4 UO_2(CO_3)_3$ wherein the mixture has a titratable basicity of 2.0 to 2.5 equivalents per liter (eq/l) and a hydronium concentration that corresponds to a pH of about 9.0 to 9.5, and which also contains carbonates, fluorides and ammonium, comprising the steps of adding sulfuric acid to the mixture until the combined mixture has a pH that is between 6.5 to 7, cooling and mixing the combined mixture while said sulfuric acid is being added in order to release the carbonates from the combined mixture until the carbonate concentration in the resulting mixture is reduced to less than 5 g/l, and to leave sulfate ions therein, adding ammonia to the resulting mixture to produce a pH between 8.4 to 9, adding an excess hydrogen peroxide to each liter of the resulting basic mixture to separate said residual basic mixture into a precipitate of $UO_4.2NH_3.2HF$ and an essentially uranium free material that contains said sulfate ions, separating said precipitate from said material as a new uranium and fluoride chemical compound.

2. $UO_4.2NH_3.2HF$.

3. A compound according to claim 2 having a powder diffraction pattern generated in response to the CuK $\alpha_1$ radiation line having a wavelength of 1.5405 Angstrom units comprising:

| d (A) (obs.) | hkl | I (est.) | |
|---|---|---|---|
| 5.85 | 200 | 100 | broad |
| | 110 | | |
| 4.23 | 001 | 20 | |
| 3.53 | 201 | 20 | |
| 3.47 | 111 | 20 | |
| 3.37 | 310 | 50 | |
| | 111 | | |
| 3.33 | 201 | 10 | |
| | 020 | | |
| 2.93 | 400 | 5 | |
| 2.89 | 220 | 5 | |
| 2.703 | 311 | 5 | |
| 2.614 | 021 | 5 | |
| 2.571 | 311 | 5 | |
| 2.478 | 401 | 5 | |
| 2.420 | 221 | 10 | |
| 2.355 | 221 | 3 | |
| 2.341 | 401 | 5 | |
| 2.209 | 510 | 5 | |
| 2.197 | 420 | 5 | |
| 2.179 | 130 | 5 | |
| 2.111 | 002 | 5 | |
| 2.020 | 202 | 3 | |
| 2.002 | 511 | 20 | |
| | 112 | | |

-continued

| d (A) (obs.) | hkl | I (est.) | |
|---|---|---|---|
| 1.983 | 421 | 3 | |
| 1.963 | 112 | 3 | |
| 1.945 | 202 | 10 | diff |
| | 131 | | |
| 1.926 | 330 | 10 | diff |
| | 131 | | |
| 1.912 | 421 | 10 | |
| | 511 | | |
| 1.829 | 312 | 3 | |
| 1.812 | 601 | 3 | |
| 1.781 | 022 | 3 | |
| 1.773 | 331 | 1 | |
| 1.760 | 402 | 1 | |
| 1.748 | 312 | 5 | |
| 1.731 | 601 | 5 | diff |
| 1.682 | 620 | 10 | diff |
| 1.662 | 040 | 5 | diff |
| 1.621 | 710 | 3 | |
| 1.609 | 530 | 3 | |
| 1.598 | 240 | 3 | |
| 1.591 | 621 | 3 | |
| 1.569 | 512 | 1 | |
| 1.556 | 422 | 1 | |
| 1.545 | 041 | 3 | diff |
| 1.535 | 621 | 1 | |
| 1.522 | 132 | 5 | |
| 1.504 | 241 | 3 | diff |
| 1.484 | 711 | 10 | diff |
| | 512 | | |
| 1.475 | 602 | 1 | |
| 1.461 | 800 | 1 | |
| 1.443 | 440 | 5 | |
| | 332 | | |
| 1.403 | 332 | 1 | diff. |
| 1.375 | 113 | 1 | diff. |
| 1.356 | 801 | 5 | |
| | 113 | | |
| 1.347 | 203 | 3 | |
| | 622 | | |
| 1.336 | 730 | 1 | |
| 1.321 | 712 | 5 | |
| | 313 | | |
| | 150 | | |
| 1.305 | 042 | 3 | |
| | 532 | | |
| 1.295 | 023 | 3 | |
| 1.283 | 242 | 1 | |
| | 622 | | |
| 1.275 | 313 | 1 | |
| 1.264 | 640 | 3 | diff. |
| | 242 | | |
| 1.257 | 821 | 3 | diff. | where the Miller indices *hkl* are well known notations used to identify the planes in crystal lattice, *d* is the separation between the planes that are characterized by the Miller indices and I is the relative intensity of a diffraction line with respect to the most pronounced line in the diffraction pattern.

4. A chemical compound according to claim 3 having a monoclinic crystalline structure comprising a first crystal unit cell side of 11.719±0.002A length, a second crystal unit cell side of 4.225±0.001A length forming an included angle of 93.39±0.01° with said first side, and a third crystal unit cell side of 6.64±0.001A length forming an angle of 90° with said first side.

5. A process for removing a thixotropic fluorine compound from a uraniferous mixture that also contains carbonates and ammonium comprising the steps of adding sulfuric acid to the mixture until the mixture pH is about 6.5 to 7 in order to separate the carbonates, adding hydrogen peroxide to said combined mixture to separate said combined mixture into a precipitated uranium and fluorine chemical compound and a filtrate, and adding calcium oxide to said filtrate to precipitate calcium fluoride and calcium sulfate in the presence of thixotropy inhibiting sulfate ions from said sulfuric acid.

6. A process according to claim 5 further comprising the step of liberating the ammonium from said filtrate while said calcium fluoride and said calcium sulfate are being precipitated.

7. A process according to claim 5 further comprising the step of extracting ammonium and water vapor from said filtrate and condensing said ammonium and water vapor into aqueous ammonia.

8. A process for the recovery of uranium, fluoride, $NH_3$ and $CO_2$ from a uraniferous mixture that is produced in converting uranium hexafluoride into uranium dioxide by way of an intermediate $(NH_4)_4 UO_2 (CO_3)_3$ wherein the mixture has a titratable basicity of 2.0 to 2.5 equivalents per liter (eq/l) and a hydronium concentration that corresponds to a pH of about 9.0 to 9.5, and which also contains carbonates, fluorides and ammonium, comprising the steps of adding sulfuric acid to the mixture until the combined mixture has a pH that is between 6.5 to 7, cooling and mixing the combined mixture while said sulfuric acid is being added in order to release the carbonates from the combined mixture until the carbonate concentration in the resulting mixture is reduced to less than 5 g/l, and to leave sulfate ions therein, adding ammonia to the resulting mixture to produce a pH between 8.5 to 9, adding an excess hydrogen peroxide to each liter of the resulting basic mixture to separate said residual basic mixture into a uranium precipitate and an essentially uranium free material that contains said sulfate ions, separating said uranium free material from the precipitate, adding calcium oxide to said material in which said sulfate ions prevent thixotropy in the resulting mixture in order to precipitate calcium fluoride and calcium sulfate, liberating ammonium and water vapor from said material during the calcium oxide addition, condensing said ammonium and water vapor into aqueous ammonia.

9. The process according to claim 8 wherein said aqueous ammonia is recycled back into said resulting mixture to produce said pH between 8.5 to 9.

* * * * *

UNITED STATES PATENT OFFICE
CERTIFICATE OF CORRECTION

Patent No. 3,980,757  Dated September 14, 1976

Inventor(s) Halit Z. Dokuzoguz

Page 1 of 5

It is certified that error appears in the above-identified patent and that said Letters Patent are hereby corrected as shown below:

Column 3, line 32, "To" should read -- The --.

Column 4, line 56, "than" should read -- Then --.

Column 9, Table 2, the "hkl column" the numbers should read as follows:

hkl

200 ⎫
110 ⎭

001

20$\bar{1}$

11$\bar{1}$

310 ⎫
111 ⎭

201 ⎫
020 ⎭

400

220

31$\bar{1}$ 021
311
40$\bar{1}$

22$\bar{1}$

221

401

510

420

130

002

20$\bar{2}$ $51\bar{1}$ ⎫
$11\bar{2}$ ⎬

$42\bar{1}$

112

202 ⎫
-- ⎬
131 ⎭

330 ⎫
131 ⎬

421 ⎫
511 ⎬

$31\bar{2}$ $60\bar{1}$

022

$33\bar{1}$ $40\bar{2}$

312

601

620

040

710

530

240

$62\bar{1}$ $51\bar{2}$ $42\bar{2}$

041

621

Patent No. 3,980,757

$13\bar{2}$
$24\bar{1}$
$711$ ⎫
$512$ ⎬
$60\bar{2}$
$800$
$440$ ⎫
$33\bar{2}$ ⎬
$332$
$11\bar{3}$
$801$ ⎫
$113$ ⎬
$203$ ⎫
$62\bar{2}$ ⎬
$730$
$71\bar{2}$ ⎫
$31\bar{3}$ ⎬
$150$
$042$ ⎫
$5\bar{3}\bar{2}$ ⎬
$023$
$24\bar{2}$ ⎫
$622$ ⎬
$313$
$640$ ⎫
$242$ ⎬
$821$

UNITED STATES PATENT OFFICE
CERTIFICATE OF CORRECTION

Patent No. 3,980,757   Dated September 14, 1976

Inventor(s) Halit Z. Dokuzoguz   Page 5 of 5

It is certified that error appears in the above-identified patent and that said Letters Patent are hereby corrected as shown below:

Column 11, line 4, "$HNO_3$)" should read -- ($HNO_3$) --.

Column 11, line 33, "8.4" should read -- 8.5 --.

Signed and Sealed this

Nineteenth Day of April 1977

[SEAL]

Attest:

RUTH C. MASON  
Attesting Officer

C. MARSHALL DANN  
Commissioner of Patents and Trademarks